Patented Feb. 20, 1951

2,542,772

UNITED STATES PATENT OFFICE 2,542,772

HIGH MOLECULAR WEIGHT CARBOXYLIC ACIDS

Howard D. Hartough, Pitman, N. J., assignor to Socony-Vacuum Oil Company, Incorporated, a corporation of New York No Drawing. Application October 16, 1945, Serial No. 622,681

11 Claims. (Cl. 260—413)

1

The present invention relates to the preparation of high molecular weight fatty acids and, more particularly, to the condensation of alkyl and acyl halides with unsaturated acids having at least one replaceable hydrogen in an alkyl chain.

It is an object of the present invention to provide a method for producing alkyl and/or acyl substituted aliphatic carboxylic acids. It is another object of the present invention to provide a means of increasing the molecular weight of aliphatic carboxylic acids. It is a further object of the present invention to provide a method for producing fatty acids having a molecular weight of at least 300. Other objects and advantages will become apparent from the following description.

In general, the present method of increasing the molecular weight of unsaturated aliphatic carboxylic acids having a replaceable hydrogen atom in an alkyl group comprises condensing an alkyl halide or an acyl halide with an aliphatic carboxylic acid of the class previously mentioned at an elevated temperature below that of reflux in the presence of a condensation agent of the Friedel-Crafts type. After the evolution of hydrogen halide has ceased, indicative that the reaction is substantially complete, the reaction mixture is treated to remove the condensation agent and unreacted components of the original reaction mixture and the acid of increased molecular weight recovered in any suitable manner.

While any alkyl or acyl halide may be used, it is preferred, primarily for reasons of economy, to use the chlorides. The unsaturated aliphatic acids such as crotonic, maleic, oleic and the like are used.

The alkyl halides may be of relatively low molecular weight, such as methyl halide, or of relatively high molecular weight, such as lauryl or octadecyl halide. Acyl halides such as acetyl halide or stearoyl halide may also be employed. Thus, oleic acid may be condensed with methyl halide or crotonic acid condensed with octadecyl halide. Similarly, oleic acid may be condensed with propionyl bromide, crotonic acid with stearoyl chloride and adipyl chloride or oxalyl chloride with oleic acid. It will be recognized by those skilled in the art that the products of these latter reactions are keto-acids. Thus, a novel method is provided for the production of keto-acids. It is to be noted that aromatic keto-acids cannot be produced by the Friedel-Crafts reaction. It is also to be observed that the corresponding acid anhydrides may replace the acids

2 in both the reaction to produce an alkyl substituted unsaturated aliphatic acid and the keto-aliphatic acid. The unsubstituted acids in question may be said to have the empirical formula $R_b(COOH)_c$ where R is an alkenyl group, $b$ is an integer equal to 1 or more and $c$ is an integer equal to 1 or 2, while the substituted acids have the empirical formula $R'_a[R_b(COOH)_c]_n$ where R is an alkenyl group, R' is selected from alkyl and acyl radicals having 1 or more valences, $a=1$ or more, $b=1$, $c=1$ or 2 and $n=1$ or more.

Although any of the condensing agents of the Friedel-Crafts type may be used, it is preferred to employ zinc chloride (fused or anhydrous) because the side reactions are reduced and the separation of the desired product from unreacted materials, resinous materials and the like is facilitated.

Generally, the reaction is carried out at temperatures above 100 degrees centigrade under pressure if necessary. Some reflux usually occurs when the reaction is carried out at atmospheric pressure. It has been found that temperatures of the order of 120 degrees to 200 degrees centigrade provide satisfactory results. Temperatures of 125 degrees to 175 degrees centigrade are preferred. It is to be understood that the reaction may require up to 9 or 10 hours after the evolution of hydrogen halide has become perceptible to reach practical completion. During the heating of the reaction mixture after the evolution of hydrogen halide has become perceptible the temperature may be lowered 15 to 30 degrees centigrade below that at which the reaction was carried on prior to the evolution of the hydrogen halide.

For the further enlightenment of those skilled in the art, the following illustrative examples are provided. However, it is to be understood that these examples are not limiting.

Example I

One hundred parts by weight of 20 per cent chlorowax (made from paraffin wax having an A. S. T. M. melting point of 120° F.) and 156 parts by weight of a mixture of fatty acids and 38 parts by weight of anhydrous zinc chloride were mixed and slowly heated to 120 degrees centigrade. Evolution of hydrogen chloride became vigorous at 120 degrees centigrade and continued through the temperature range 120–135 degrees centigrade. The heating of the reaction mixture was continued for about 3 hours, after which time the evolution of hydrogen chloride had practically ceased. After the reaction for practical purposes had ceased, the reaction mixture was water-washed three times to remove the zinc chloride. When it is desired to improve the color of the finished product, a small amount of zinc dust is added to the reaction mixture before water-washing. The reaction mixture is cooled and after diluting with a suitable solvent, say benzol or the like, the diluted reaction mixture containing the zinc dust is treated with dilute mineral acid. Thereafter, the reaction mixture is treated to remove zinc chloride and excess mineral acid, hydrochloric acid, for example, as by water-washing. The solvent is then removed in any convenient manner as by distillation to leave the desired product as a still residue. When desirable the still residue can be further purified in any suitable manner.

The mixture of fatty acids which has been reacted as described hereinbefore has the following composition:

| | Per cent |
|---|---|
| Palmitic acid | 2.7–2.8 |
| Stearic acid | 5.4–7.7 |
| Oleic acid | 6–12 |
| Linoleic acid | 35–47 |
| Linolenic acid | 37–42 |

The chlorinated paraffin wax, or chlorowax as it is sometimes called, is prepared from a paraffin wax having an A. S. T. M. melting point of about 120° F. to about 130° F. This wax is predominantly a mixture of aliphatic hydrocarbons having more than 20 carbon atoms in the molecule and averaging about 24 carbon atoms in the molecule. The mixture has an average molecular weight in the neighborhood of 340.

The wax is melted and heated to about 200° F.; chlorine can be bubbled through until the desired amount, about 20 per cent is absorbed. Higher temperatures may be used to accelerate the reaction but if too high are likely to darken the product. The product contains mono- as well as poly-chlorinated paraffins together with a small amount of unchlorinated material. Those skilled in the art will understand that paraffin wax with a much higher chlorine content, say about 45 per cent, may also be used.

The still residue was found to be soluble in hot 10 per cent potassium carbonate solution. Upon analysis the still residue was found to have a neutralization number (N. N.=mg. KOH/g.) of 99.5, a saponification number (S. N.) of 120.9, an iodine number (mg. I/g.) of 38 and a molecular weight of 1815. The fatty acids used as starting material have a calculated iodine number of 184–190, a neutralization number of 202, and an average molecular weight of 280. Accordingly, it would appear that the still product is a mixture of acids produced by alkylating about 4 molecules of fatty acid with 2 molecules of wax. Thus, the wax portion of the molecule has a molecular weight of 672, the average molecular weight of the fatty acids is about 280; 1815 minus 672 equals 1143; 1143/280=4.

| | |
|---|---|
| Observed molecular weight | 1815 |
| Calculated molecular weight | 1794 |
| Observed saponification number | 120.9 |
| Calculated for $C_{116}H_{222}(COOH)_4$ | 125 |

It is to be noted that those skilled in the art recognize that in the determination of molecular weights of this magnitude the limit of accuracy is about ±10 per cent. Consequently, the observed molecular weights given herein are to be considered to cover the range of ±10 per cent of the value given.

Example II

One hundred parts by weight of 20 per cent chlorowax, 159 parts by weight of oleic acid and 10 parts by weight of anhydrous zinc chloride were mixed and treated as in Example I. The product had a neutralization number of 73.8, a saponification number of 86, an iodine number of 52, a residual chlorine content of 2.05 per cent and a molecular weight of 885.

The calcium salt of this acid was prepared by treating the acid with equimolar quantities of aqueous potash. The potassium salt thus obtained was converted to the calcium salt thereof by the addition of aqueous calcium chloride. The calcium salt was a powdery white solid. Analysis:

| | Per cent |
|---|---|
| Calcium observed | 5.1 |
| Calculated for molecular weight 898 | 4.6 |
| Calculated for $Ca(C_{17}H_{33}COO)_2$ | 8.1 |

The calcium salt appeared to be that of an acid having the empirical formula $$C_{24}H_{48}(C_{17}H_{32}COOH)_2$$

or $C_{58}H_{112}(COOH)_2$ having a calculated molecular weight of 898 as compared with an observed molecular weight of 885±10 per cent. The calculated iodine number for such a substituted oleic acid would be 57; the observed value was 52.

Example III

One hundred and fifty parts by weight of 20 per cent chlorowax, 83 parts by weight maleic anhydride and 10 parts by weight anhydrous zinc chloride were mixed and heated slowly. At 80 degrees to 90 degrees centigrade the evolution of hydrogen chloride was observed. Evolution of hydrogen chloride became quite vigorous at 120 degrees to 130 degrees centigrade and the temperature of the reaction mixture was maintained at 120 degrees to 130 degrees centigrade for two hours followed by a period of one hour at a temperature of 150 degrees to 160 degrees centigrade. The reaction mixture was worked up as described hereinbefore. The product had a neutralization number of 58, a saponification number of 151, a residual chlorine content of 0.01 per cent and a molecular weight of 1625±10 per cent. A substituted maleic acid of the following formula $$C_{96}H_{192}\begin{bmatrix}C-COOH \\ \| \\ C-COOH\end{bmatrix}_2$$

would have a molecular weight of 1572 and a saponification number of 142. The calculated saponification number for this acid is 142 which is to be compared with an observed saponification number of 151.

Example IV

Forty parts by weight of maleic acid, 115 parts of stearoyl chloride and 10 parts of anhydrous zinc chloride were mixed and treated as in Example I. The solid waxy material gave the following analyses: neutralization number=90, saponification number=148, and molecular weight=758. It is to be noted that the foregoing is illustrative of the method of producing ketoacids.

Example V

Two hundred and four parts (1 mole) of lauryl chloride and 280 parts (1 mole) of oleic acid were thoroughly mixed. To the mixture was added 40 parts by weight of fused zinc chloride. The reaction mixture was heated to 175 degrees centigrade for 90 minutes before the evolution of hydrogen chloride was noted. (At this time the $ZnCl_2$ sludge appeared to go into solution.) Some reflux was observed and the temperature was lowered to about 160 degrees centigrade and held at this temperature for about 9 hours until the evolution of hydrogen chloride had become negligible. The reaction mixture was treated further as in previous examples with the unreacted lauryl chloride and oleic acid being topped off under vacuum. The yield of alkylated acid was 315 parts by weight. The product had a neutralization number of 74, a saponification number of 107, an iodine number of 55 and a molecular weight of 587.

The calcium salt of this alkylated acid was prepared by adding 10 grams of the acid to 0.74 gram of potassium hydroxide dissolved in 50 milliliters of absolute alcohol. Fifty milliliters of absolute alcohol were added and solution boiled for 15 minutes to obtain the potassium salt. A solution of anhydrous calcium chloride in absolute alcohol was made by dissolving 0.75 gram of anhydrous calcium chloride in 25 milliliters of absolute alcohol. The calcium salt of the alkylated acid was made by adding the solution of calcium chloride to the solution of the potassium salt of the alkylated acid. A gelatinous precipitate was formed immediately. The alcoholic solution was decanted from the precipitate and the precipitate digested 10 minutes with 50 milliliters of boiling alcohol. The suspension was allowed to settle and the alcohol decanted. Upon evaporation 3.5 grams of material were recovered. This material was acidic indicating unreacted acid. The alcohol-washed precipitate was dissolved in petroleum ether, in which calcium oleate and calcium stearate are insoluble, and 0.80 gram of potassium chloride was removed by filtration. On evaporation of the petroleum ether 7.0 grams of the calcium salt of the alkylated oleic acid were recovered. 1.0020 grams of this calcium salt were ashed to give 0.0475 gram of calcium oxide (CaO) equivalent to 3.38 per cent calcium. A calcium salt containing 3.38 per cent calcium has a molecular weight of 1183. To produce a calcium salt having a molecular weight of 1183 the monobasic acid from which the salt is produced has a molecular weight of 572.

In a similar manner a cobalt salt of the alkylated oleic acid was prepared. 1.0773 grams of the cobalt salt when ashed gave 0.0750 gram of cobalto-cobaltic oxide ($Co_3O_4$) equivalent to 5.11 per cent cobalt. The molecular weight of a salt containing 5.11 per cent cobalt is 1195. To produce a salt of this molecular weight, an acid having a molecular weight of 569 is required.

To produce an acid of molecular weight of 569–587 a mixture of mono- and dilauryl oleic acid must be present since a monolauryl oleic acid would have a molecular weight of 450 and a dilauryl oleic acid would have a molecular weight of 619. Therefore, it would appear that the product obtained was a mixture of monolauryl and dilauryl oleic acids containing 28 per cent of the mono-derivative and 72 per cent of the disubstituted oleic acid.

The topped reaction product had a saponification number of 107. A mixture containing 28 per cent mono-, and 72 per cent dilauryl oleic acid will have a saponification number of 100. The calculated iodine number for such a mixture is 48.5, which checks the observed value of 55.

It will be observed that the reaction products obtained by condensing an alkyl or acyl halide with oleic acid had iodine numbers of appreciable magnitude. Accordingly, the novel acids of the present invention are substituted unsaturated aliphatic acids and may be monocarboxylic or polycarboxylic acids having structures represented by the following formula:

$$R'_a[R_b(COOH)_c]_n$$

where $R$ = alkenyl group
$R'$ = alkyl or acyl group having one or more valances
$a$ = one or more
$b$ = one only
$c$ = one or two
$n$ = one or more

I claim:

1. The method of producing unsaturated aliphatic carboxylic acids having a molecular weight of about 1800 which comprises reacting about 100 parts by weight of 20 per cent chlorowax and about 156 parts by weight of a mixture of fatty acids containing about 37 to about 42 per cent by weight linolenic acid, about 35 to about 47 per cent by weight linoleic acid, about 6 to about 12 per cent by weight oleic acid, 8 to about 11 per cent palmitic acid and stearic acid in the presence of about 38 parts by weight of anhydrous zinc chloride at about 120 to about 135° C. to obtain a reaction mixture, water washing the reaction mixture to remove zinc chloride and dehydrating said washed reaction product.

2. The method of producing substituted oleic acid which comprises mixing 100 parts by weight of 20 per cent chlorowax, 159 parts by weight of oleic acid and 10 parts by weight of anhydrous zinc chloride to form a reaction mixture, heating said reaction mixture to a temperature of about 120 to about 135° C., water washing said reaction mixture to remove zinc chloride and dehydrating said water washed reaction mixture.

3. The method of producing substituted unsaturated aliphatic carboxylic acids having a molecular weight of about 885 to about 900 which comprises mixing about 100 parts by weight of 20 per cent chlorowax prepared by chlorinating paraffin wax having a melting point of about 120° F., about 160 parts by weight of unsaturated aliphatic carboxylic acid and about 10 parts to about 40 parts by weight of anhydrous zinc chloride to form a reaction mixture, heating said reaction mixture at about 120° C. to about 135° C. to obtain a reaction product, water washing said reaction product to remove zinc chloride, and dehydrating said reaction product.

4. The method as set forth and described in claim 1 wherein the reaction mixture is cooled, diluted with a solvent to form a solution of the reaction product, zinc dust and mineral acid are added to the solution of reaction product to improve the color of the product, the solution is water washed and the washed solution distilled to remove solvent and leave a product of improved color as a still residue.

5. Alkyl substituted maleic acid having a molecular weight in excess of 1500 and a saponification number of about 151.

6. A mixture of mono- and dilauryl oleic acid having a molecular weight of about 587, a saponification number of about 107, and an iodine number of about 55.

7. The method of producing an unsaturated aliphatic carboxylic acid having increased molecular weight from a lower molecular weight unsaturated aliphatic carboxylic acid, which comprises: reacting a halide selected from the group consisting of an alkyl halide and an acyl halide, all carbon atoms of said alkyl and acyl halides being of aliphatic character, with said lower molecular weight acid in the presence of zinc chloride at an elevated temperature above ambient temperature and not greater than that of reflux; and separating said acid having increased molecular weight from the reaction mixture thus formed.

8. The method of producing an unsaturated aliphatic keto acid which comprises: reacting an acyl halide, all carbon atoms of which are of aliphatic character, with an unsaturated aliphatic carboxylic acid in the presence of zinc chloride at a temperature between about 100° C. and about 200° C.; water washing the reaction mixture thus formed to remove zinc chloride therefrom; and dehydrating said water-washed reaction mixture, thereby obtaining said keto acid.

9. The method of producing an unsaturated aliphatic carboxylic acid having increased molecular weight from a lower molecular weight unsaturated aliphatic carboxylic acid, which comprises: reacting an alkyl halide, all carbon atoms of which are of aliphatic character, with said lower molecular weight acid in the presence of zinc chloride at a temperature between about 100° C. and about 200° C.; water washing the reaction mixture thus formed to remove zinc chloride therefrom; and dehydrating said water-washed reaction mixture, thereby obtaining said unsaturated aliphatic carboxylic acid having increased molecular weight.

10. The method of producing an unsaturated aliphatic polycarboxylic acid from an unsaturated aliphatic monocarboxylic acid, which comprises: reacting a polyhalogenated aliphatic hydrocarbon, all carbon atoms of which are of aliphatic character, with said monocarboxylic acid in the presence of zinc chloride at a temperature between about 100° C. and about 200° C.; water washing the reaction mixture thus formed to remove zinc chloride therefrom; and dehydrating said water-washed reaction mixture, thereby obtaining said polycarboxylic acid.

11. An unsaturated aliphatic polycarboxylic acid having a molecular weight of about 885 to about 900, a saponification number of about 86, and an iodine number of about 52, and obtained by the condensation of one of the group alkyl and acyl halides, all carbon atoms of which are of aliphatic character, with an unsaturated aliphatic carboxylic acid.

HOWARD D. HARTOUGH.

REFERENCES CITED

The following references are of record in the file of this patent:

UNITED STATES PATENTS

| Number | Name | Date |
| --- | --- | --- |
| 1,927,295 | Powers | Sept. 19, 1933 |
| 2,060,195 | Goldschmidt et al. | Nov. 10, 1936 |
| 2,144,324 | Bowles et al. | Jan. 17, 1939 |
| 2,210,305 | Rheineck | Aug. 6, 1940 |
| 2,293,649 | Howk | Aug. 18, 1942 |

OTHER REFERENCES

Cowan et al., Oil and Soap, August 1943, pp. 153–157.

Bradley et al., Ind. and Eng. Chem. 29, 1270–1276 (1937).

Calloway. Chem. Rev. 17, 375 (1935).

Certificate of Correction

Patent No. 2,542,772 February 20, 1951

HOWARD D. HARTOUGH

It is hereby certified that error appears in the printed specification of the above numbered patent requiring correction as follows:

Column 6, line 12, for the word "mole" read *more*;

and that the said Letters Patent should be read as corrected above, so that the same may conform to the record of the case in the Patent Office.

Signed and sealed this 31st day of July, A. D. 1951.

[SEAL]

ERNEST F. KLINGE,
*Assistant Commissioner of Patents.*